US008677151B2

(12) United States Patent
Suzuki et al.

(10) Patent No.: US 8,677,151 B2
(45) Date of Patent: Mar. 18, 2014

(54) CONTENT PLAYBACK METHOD AND RECORDING AND PLAYBACK DEVICE

(75) Inventors: Takayuki Suzuki, Sagamihara (JP); Mika Mizutani, Tokyo (JP); Mitsunobu Watanabe, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1458 days.

(21) Appl. No.: 12/044,128

(22) Filed: Mar. 7, 2008

(65) Prior Publication Data
US 2008/0235522 A1     Sep. 25, 2008

(30) Foreign Application Priority Data
Mar. 19, 2007   (JP) .................................. 2007-069761

(51) Int. Cl.
*G06F 12/14* (2006.01)
(52) U.S. Cl.
USPC ............................. 713/193; 380/44; 386/194
(58) Field of Classification Search
USPC .......................................................... 380/286
See application file for complete search history.

(56) References Cited

U.S. PATENT DOCUMENTS

| 2003/0081792 | A1* | 5/2003 | Nakano et al. ................. 380/286 |
| 2003/0140239 | A1* | 7/2003 | Kuroiwa et al. .............. 713/193 |
| 2004/0156509 | A1* | 8/2004 | Nakano et al. ................. 380/281 |
| 2004/0198494 | A1* | 10/2004 | Nguyen et al. .................. 463/42 |
| 2005/0234832 | A1  | 10/2005 | Kanai |
| 2007/0110236 | A1* | 5/2007 | Tada ............................. 380/201 |
| 2007/0183747 | A1* | 8/2007 | Watanabe et al. ............... 386/94 |
| 2008/0063210 | A1* | 3/2008 | Goodman et al. ............. 380/286 |

FOREIGN PATENT DOCUMENTS

| JP | 2003-331509 | 11/2003 |
| JP | 2005-285287 | 10/2005 |

OTHER PUBLICATIONS

Watanabe et al., JP 2006-026496 Translation, Feb. 6, 2006.*
Recording and Playback Device for iVDR, TV recording Specification, SAFIA License Group, Feb. 2008.

* cited by examiner

*Primary Examiner* — Ashok Patel
*Assistant Examiner* — Andrew Goldberg
(74) *Attorney, Agent, or Firm* — Antonelli, Terry, Stout & Kraus, LLP.

(57) ABSTRACT

Where a follow-up playback is realized for content data that is recorded by changing an encryption key at predetermined intervals for copyright protection, fast feed and playback operations are provided that can get close to a video scene of a present point of time. There are two areas on the memory in which to manage key information. The key information and seed information being written into a hard disk drive are held in memory in order to allow access to the key information and seed information even as they are written.

9 Claims, 6 Drawing Sheets

CONTENT PLAYBACK METHOD AND RECORDING AND PLAYBACK DEVICE

INCORPORATION BY REFERENCE

The present application claims priority from Japanese application JP2007-069761 filed on Mar. 19, 2007, the content of which is hereby incorporated by reference into this application.

BACKGROUND OF THE INVENTION

The present invention relates to a content playback method and a recording and playback method that use content storage media with a copyright protection function, especially removable content storage media Digital broadcasting in recent years encrypts content data by adding a limiting signal, such as "copy once" signal, to it from the standpoint of copyright protection. Compatible recorders therefore encrypt content data on their own and store it on a hard disk drive to prevent an illicit use of or inadvertent leak of the content data due to human errors. When content data recorded in a hard disk drive is written into a DVD or Blue-ray Disk, the content data stored in the hard disk drive is deleted (by a move function), thus conforming to a rule of "copy once".

However, there is a problem with this method. That is, since a recorder encrypts content data on its own, a removable hard disk drive cannot be used, which is inconvenient to the user. Under this circumstance, a removable hard disk drive "Secure iVDR" with a copyright protection function has become available on the market. The Secure iVDR has a function of independently managing usage passes, which include encrypted content data and its decryption key, a function of protecting stored usage passes against illicit access, and a function of transferring usage passes with a PKI-based bidirectional authentication, and realizes a copyright protection of content data which have been separately stored from the usage passes.

Further, for music players to play music content and for video players to play video content, specifications have been defined using this content copyright protection function. In the case of a video player, a logical block of contiguous 3072 bytes obtained by dividing a video stream is called an access unit (AU) and encryption is performed in units of AU. A logical block of contiguous 512 AUs is called an allocation unit (ALU), which constitutes a minimum unit in which video data is encrypted by one usage pass. In realizing a move function for content data, the Secure iVDR is required to change the usage pass in less than one minute, considering the fact that the time during which content data are allowed to overlap each other is less than 1 minute (see Recording and Playback Device for iVDR—TV recording specification (http://www.safia-1b.com/).

In a recorder using such a Secure iVDR, a normal playback is realized by performing a mutual authentication between a recorder body and the Secure iVDR, establishing an encrypted communication path using a usage pass transfer protocol between the recorder body and the Secure iVDR, safely reading the usage pass, decrypting separately read encrypted content data with an encryption key saved in the usage pass, and transferring the decrypted data to a decoder. However, since the recorder body and Secure iVDR use a built-in CPU, there is a possibility that safely writing/reading the usage pass may take much time.

On the other hand, a hard disk recorder in general can simultaneously play a content that is being recorded in a mode called a follow-up playback. This type of viewing is done when the user temporarily leaves a television he is watching. On leaving the TV, the user starts this mode of recording and, when he returns, resumes viewing the video from where he left off. In this type of viewing, it is considered necessary to get the playback state as close to the currently broadcast state as possible (or to catch up with the current broadcast state).

In the Secure iVDR or removable hard disk drive, a recording needs writing the usage pass into a hard disk drive and a playback requires reading the usage pass from the hard disk drive.

For example, in JP-A-2005-285287, since the follow-up playback is performed by using a content key held in a content key generation module without reading the content key from the storage medium hard disk, the key information is held in memory.

The follow-up playback is a playback that reads content data recorded in a hard disk drive.

Under these premises, to realize a catch-up, it is necessary for the playback processing side to be able to successively locate a current recording position (hard disk writing position). In this case, it is possible to get close even to the unit data block being written into the hard disk.

Further, when the Secure iVDR is used, the playback processing side must also be able to safely use the content data key information usage pass. For this purpose, one method may involve, as in normal processing, writing a usage pass into a hard disk drive and reading it. However, since this operation is executed by a CPU built into the Secure iVDR, the writing/retrieval of the usage pass takes time. If, for example, it takes a few seconds, the playback that can be realized can only play the content data lagging the currently broadcast state with a delay of a few seconds. So, the catch-up cannot be realized.

In JP-A-2005-285287, since the playback is performed by using a content key held in the content key generation module, an overhead of reading the content key from the hard disk drive can be eliminated. However, JP-A-2005-285287 provides one encryption key for the content data and does not contemplate a situation where the content key may change in a playback time of as short as one minute.

If the content key is to be saved always in memory, it is necessary, in the case of 120-minute content data for example, to have at least 120 pieces of key information. Each piece of key information needs at least 64 B, so about 8 kB of memory is required. If information on this memory should leak, a decryption key for entire content data can become available for a third person, which poses a security problem.

Further, if an arrangement is made to hold only one encryption key in memory and, when recording is finished, store it in the hard disk drive, the catch-up time cannot be made less than one second at the timing of writing the encryption key because the writing takes time (of the order of seconds).

SUMMARY OF THE INVENTION

To overcome the above problem, two areas are provided on the memory to manage the key information. Further, the key information and seed information being written into the hard disk drive are held on the memory in order to allow access to the key information and seed information even as they are being written.

More specifically, the above problem is solved by the following means.

A device provided to record and play back content data requiring copyright protection, comprises: a storage medium having a first area and a second area, the first area being used to store an encryption/decryption key after the content data is encrypted by changing an encryption key at a predetermined frequency, the second area being used to store the content data via an encrypted communication path that is established after a decryption key for decrypting the encrypted content data is verified; and a CPU to execute programs and a memory; wherein when the content data is recorded in the storage medium, a first decryption key to decrypt the content data is generated and held on the memory; wherein when, with the elapse of the predetermined period, an encryption key for the content data is changed, a second decryption key is generated and held on the memory; wherein an identifier of the first decryption key and a range of decryption are stored in the first area of the storage medium, an authentication is executed between the storage medium and the device, an encrypted communication path is established, and the decryption key and the identifier are written into the second area; wherein when the writing of the decryption key and the identifier is completed, the first decryption key is discarded from the memory; wherein, when the content data being recorded is played or fast-fed, if the decryption key corresponding to a playback position is the first decryption key or the second decryption key on the memory, the content data is decrypted by using the first or second decryption key, or if the first decryption key or the second decryption key on the memory does not match the playback position, an identifier of a decryption key is extracted from the range of decryption in the first area of the storage medium; wherein an authentication is performed between the storage medium and the device, an encrypted communication path is established, and a decryption key corresponding to the identifier is read from the second area to decrypt the content data, thus performing playback or fast-feed of the content data.

The storage medium is removable.

A content playback method is provided which comprises the steps of: in content data recording processing, generating a key for encrypting the content data; generating a first key for decrypting the encrypted content data and storing it on a memory; encrypting the content data and recording the encrypted content data in a storage medium; monitoring a content recording time, updating the encryption key at a predetermined frequency and storing on the memory the corresponding second decryption key; performing an authentication of the storage medium, establishing an encrypted communication path and writing the first key into the storage medium; in content data playback processing or fast feed processing, determining whether the first key and the second key can be used as a decryption key for content that is to be played back or fast fed; if they can be used, decrypting content data by the first key or the second key; if they cannot be used, authenticating the storage medium, establishing an encrypted communication path and reading a corresponding key; and decrypting the content data using the key read out.

With this invention, when a removable content storage media with a copyright protection function (high level of security) is used, a follow-up playback can be realized that can get very close to the current broadcast state, with little possibility of leak of key information.

DESCRIPTION OF THE INVENTION

One embodiment of the present invention will be explained by referring to FIG. 1 through FIG. 7.

Figure 1:
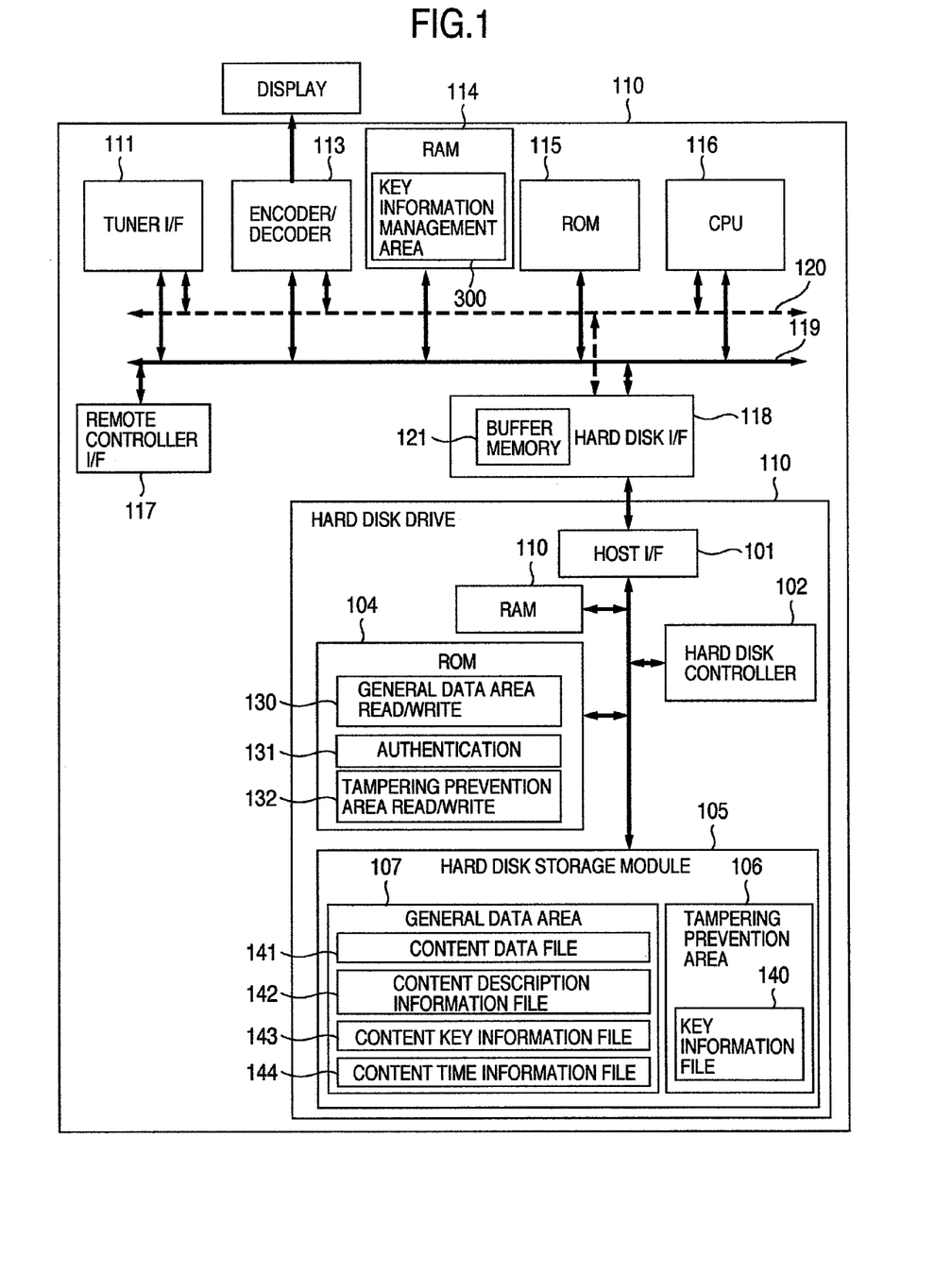
FIG. 1 shows a configuration of a content recording and playback device and a removable hard disk drive with a copyright protection function according to one embodiment of this invention.

FIG. 1 shows a configuration of a content recording and playback device 110 that embodies the present invention. The content recording and playback device 110 comprises a tuner I/F 111 connecting to a digital broadcast receiving tuner, an encoder/decoder 113 to encode the broadcast received from the tuner I/F and decode information read from the hard disk drive, a remote controller I/F module 117 to accept a demand from a remote controller operated by the user, a ROM 115 in which to store programs, a CPU 116 to execute the programs, a RAM 114 necessary for program operation, and a hard disk I/F module 118, connected to a removable hard disk drive (Secure iVDR) 100 with a copyright protection function and having a buffer memory 121 to temporarily store content data, and an internal bus 119 connecting these. The tuner I/F 111, encoder/decoder 113, CPU 116 and hard disk I/F module 118 are connected together by a bus 120 dedicated for content data.

The hard disk drive 100 comprises a host I/F module 101 connected to the hard disk I/F module 118; a hard disk storage module 105 to store data; a hard disk controller 102 to control a spindle that rotates recording disks (platters) making up the hard disk storage module 105 by an electric motor and an arm/actuator that drives a read/write head to and from; a ROM 104 to store programs to be executed by the hard disk controller; and a RAM 103 to store data temporarily.

The hard disk storage module 105 comprises a tampering prevention area 106 and a general data area 107. The tampering prevention area 106 stores a file 140 containing device verification information and content encryption/decryption key information. The general data area 107 stores a content data file 141 for each recorded program, a content description information file 142 to manage information such as program names and recording times, a content key information file 143 to manage key information and information on a range of content covered by the key, and a content time information file 144 to manage I frame time and position information.

Although FIG. 1 shows a built-in type configuration, other configuration may be employed in which the user can easily remove the hard disk modules from slots. Another configuration is also possible in which even a built-in type hard disk module can easily be taken out by opening a cubicle of the hard disk drive.

The ROM 104 in the hard disk drive 100 stores programs to be executed by the hard disk controller, i.e., general data area read/write processing 130, verification processing 131 on a device to which the hard disk drive is connected, and tampering prevention area read/write processing 132.

In this embodiment, the hard disk storage module 105 is provided with the tampering prevention area 106 so that an area to be accessed can be selected by the hard disk controller 102. It is also possible to separately provide a secure module having, for example, verification processing, tampering prevention area read/write processing and a tampering prevention area.

Figure 2:
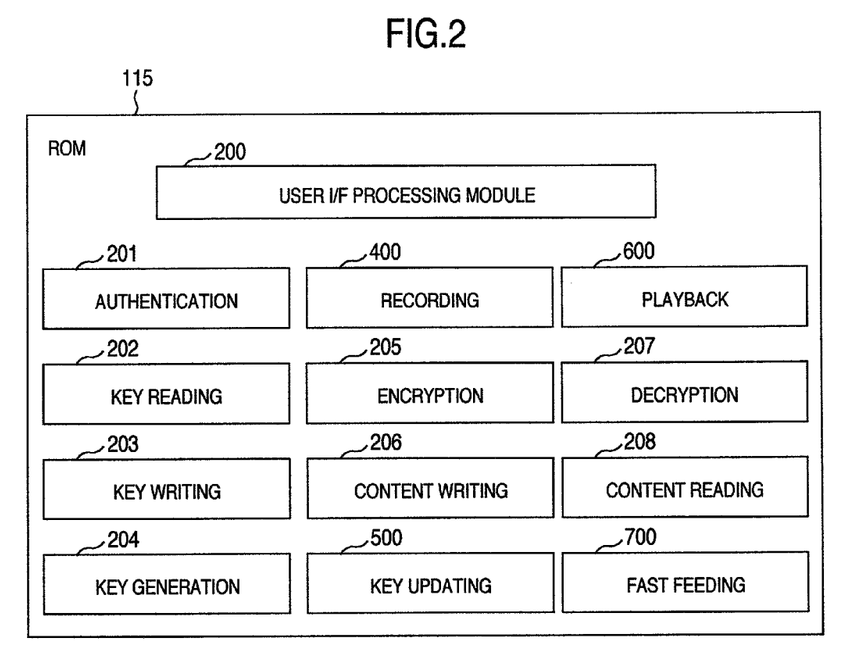
FIG. 2 shows programs involved in a follow-up playback operation of the content recording and playback device according to the embodiment.

FIG. 2 shows programs for recording and playback operations in the content recording and playback device 110 connected to a removable hard disk drive 100 with a copyright protection function.

Processing to execute the recording and playback operations when the content recording and playback device 110 is connected to the removable hard disk drive 100 with a copyright protection function are: a user I/F module 200 to select processing to be executed, upon receiving control from a remote controller; recording processing 400 to execute recording; encryption processing 205 executed in the recording processing 400; content write processing 206 to write encrypted content data into the hard disk storage module in the hard disk drive; playback processing 600 to execute playback; content read processing 208 in the playback processing 600 to read encrypted content data from the hard disk storage module of the hard disk drive; decryption processing 207 to decrypt the content data read out; fast feed processing 700; authentication processing 201 to execute mutual authentication between the hard disk drive 100 and the content recording and playback device 110; key writing processing 203 to generate key information corresponding to the content during recording and write the key information in the tampering prevention area 106 in the hard disk storage module 105 of the hard disk drive 100; key reading processing 202 to read key information from the tampering prevention area 106 in the hard disk storage module 105 of the hard disk drive 100 during playback; and key update processing 500 to update key for recording.

In the Secure iVDR, the key information is called usage pass.

Figure 3:
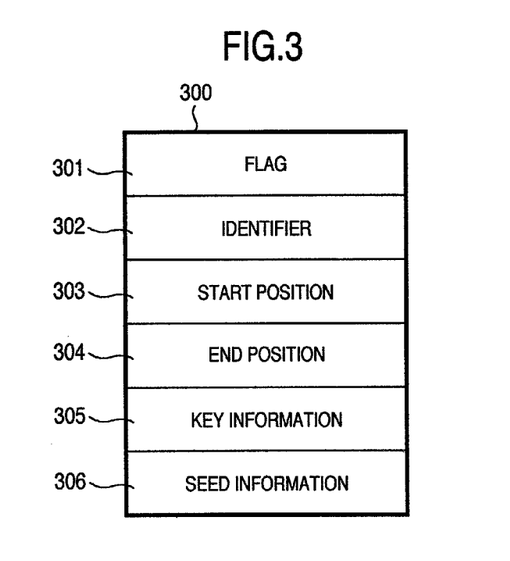
FIG. 3 shows an example structure of a key information management area.

FIG. 3 shows a configuration of a key information management area 300.

Although in FIG. 1 the key information management area 300 is located on the RAM 114, it may be put on a part of the buffer memory 121 of the hard disk I/F module 118.

There are provided two of the key information management areas 300.

The key information management area 300 has a flag 301, an identifier 302, a start position 303 and an end position 304 of content data to be encrypted or decrypted, key information 305 and seed information 306.

The flag 301 has three states—a "free" state in which recording processing is not used, a "using" state in which key information to be used for encryption is currently loaded in the key information management area 300, and a "writing" state in which the writing operation is performed on the tampering prevention area 106 in the hard disk storage module 105 of the hard disk drive 100.

While in this embodiment an encryption key and a decryption key are the same, they may be different keys. In that case, key information for decryption and seed information need to be set in the key information management area 300.

The identifiers 302 are successively assigned "1" and subsequent numbers when the content data recording starts.

To increase security, the key information may be encrypted and placed in the management area so that it does not make sense unless it is subjected to the key reading operation and the key writing operation. In that case, if the key information management area should be read out illicitly, the key information cannot be made available unless the program processing is analyzed.

Further, at time of initialization the key information management area 300 has its flag set to "free" and other items to "0".

Now, a processing flow of the follow-up playback will be explained by referring to FIG. 4 through FIG. 7.

When the user selects a follow-up playback, a recording of a selected channel is started. At this time, a video on a display is halted. In this state, selecting a user playback starts a playback from the halted state. A fast feed can be done from the playback mode. In that case, it is necessary to get as close to the current broadcasting state as possible (or to catch up with the current broadcasting state). When the fast feed comes near the current recording point, the fast feed changes to a normal playback.

The user selects a desired channel on a remote controller and also a follow-up playback. The user I/F module 200 accepts a user demand, decides that a recording for the follow-up playback is started, starts the recording processing 400 and at the same time stops the replayed video on the display.

When the recording processing 400 is started, content data, that is generated by encoding into a format of MPEG2TS (Moving Pictures Experts Group 2 Transport Stream) through the encoder 113 a video of the corresponding channel of the digital broadcast received through the tuner I/F 111, is automatically accumulated in the buffer memory 121 of the hard disk I/F module 118 through the content data dedicated bus 120.

Figure 4:
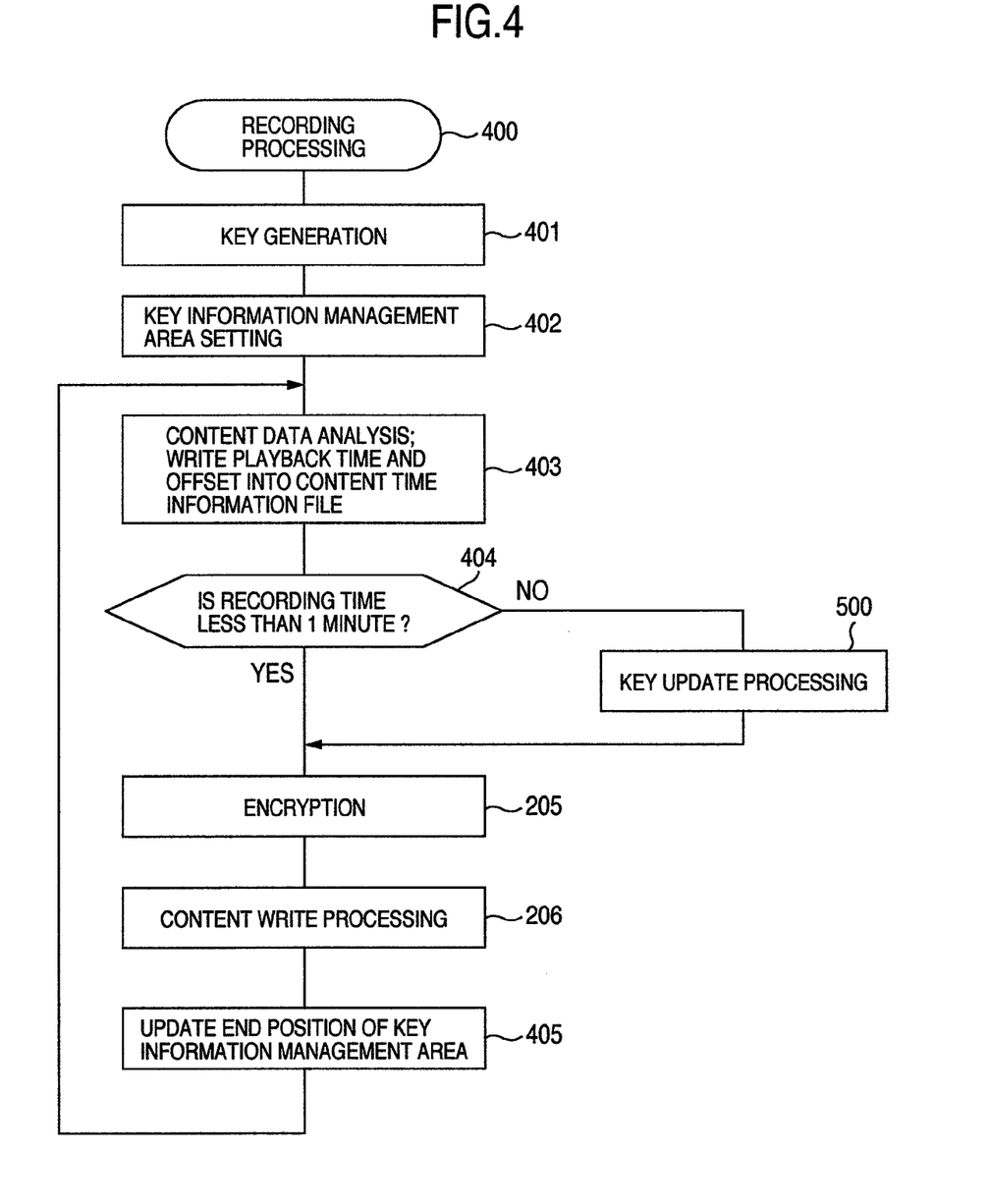
FIG. 4 shows an example flow of recording processing.

A flow of the started recording processing 400 will be explained by referring to FIG. 4. First, key generation processing 204 is started to request the generation of key information and seed information required for encrypting content data (step 401).

Next, a key information management area 300 is set (step 402). More specifically, the key information and seed information are written into the key information management area 300. The flag 301 is set to "using" and the identifier 302 to "1". Two of the key information management areas 300 are used alternately.

Here, as the start position 303 an ALU identifier "1" is written and the end position is written with "0" (step 403). As the recording is started, the ALU identifiers are successively assigned consecutive numbers, beginning with "1". And in units of ALU, the content encryption processing 205 and the writing into the hard disk drive 100 are executed. In this embodiment, processing is executed, one ALU (1.5 MB) at a time.

Although the management is executed in units of ALU, it is also possible to determine the start position and the end position in terms of offset (in bytes) from the recording start, without regard to the ALU unit.

Content data is analyzed and I frame of MPEG2TS is extracted. At the same time a playback time added by the encoder 113 is read out. When I frame is extracted, an offset from the head of an area where the I frame is stored and a playback time are written into the content time information file 144 (step 403).

The playback time of the content data is monitored (step 4040). If an elapsed time exceeds one minute, the key update processing 500 is executed (step 500).

The encryption processing 205 is started to encrypt the content data accumulated in the buffer memory 121 in units of ALU (step 205). In this case, the key information and seed information are notified. This information notification at the start of the encryption processing may not be done, unless there is any change. If the encryption processing 205 is initiated following the start of the key update processing 500, new key information and seed information are notified again.

The content data that has been encrypted is written as a content data file 141 into the general data area 107 of the hard disk storage module 105 of the hard disk drive 100 (step 206). In writing first content data, the content data file 141 is opened and its file name is stored as a content description information file 142.

When the writing operation is complete, the value of the end position 304 of the key information management area 300 is incremented (step 405).

Figure 5:
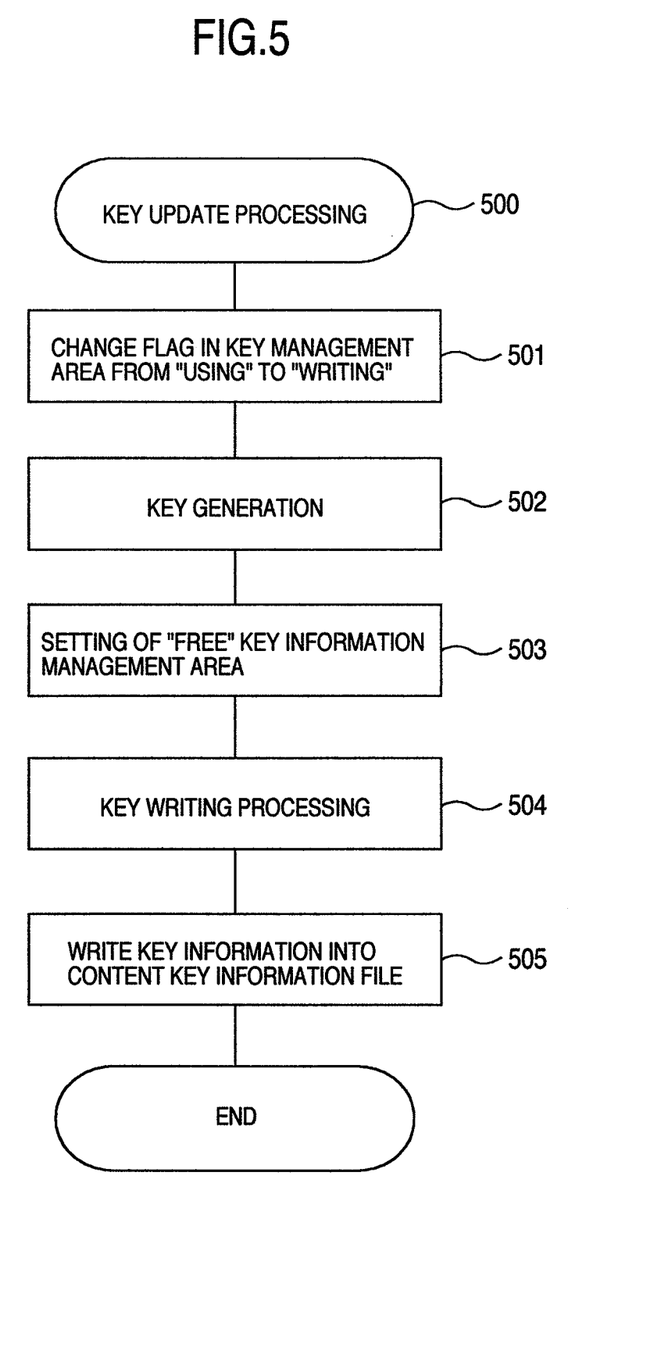
FIG. 5 shows an example flow of key information update processing.

A flow of the key update processing 500 will be explained by referring to FIG. 5. In the key update processing 500, the flag 301 of the key information management area 300 is set to "writing" (step 501).

Next, the key generation processing 204 is started (step 502) and the setting of the key information management area 300 is made as follows (step 503). Key information and seed information necessary for encrypting content data are written into the key information management area 300 whose flag is "free". Its flag 301 is set to the "using" state. The start position 303 and end position 304 of the key information management area 300 are assigned the value of the end position 304 of another key information management area 300 (whose flag 301 is "writing"), and the start position 303 is increased by "1".

The identifier 302 of the key information management area 300 is assigned the value of an identifier 302 of another key information management area 300 (whose flag 301 is "writing") incremented by "1".

Next, the key writing processing 203 is instructed to write into the tampering prevention area 106 (step 504).

Next, the information of the key information management area 300 excluding the flag 301, key information 305 and seed information 306 is written into the content key information file 143 (step 505).

If this is the first time that the recording is started, the file is opened for writing. With the above sequence of steps taken, the key update processing 500 is completed and the control returns to the recording processing.

The key writing processing 203, in cooperation with the tampering prevention area read/write processing 132 in the hard disk drive 100, performs writing into the tampering prevention area 106. More specifically, it executes authentication, establishes an encrypted communication path, exchanges key information over the communication path, and writes information of the key information management area 300 excluding the flag as the key information in the tampering prevention area 106.

When the writing is finished, the flag 301 of the written key information management area 300 is changed to "free" before terminating the processing. In this way the recording processing is continued.

When the user demands a stop from a remote controller, the recording processing 400 that has accepted the demand through the user I/F module 200 initiates stop processing. Data accumulated in the buffer memory 121 is subjected to the recording processing and the recording time is written into the content description information file 142. Then, the content data file 141, content key information file 143, content time information file 144 and content description information file 142 are closed. The key information management area 300 is set to the initialized state.

Processing to be executed when a playback is started while a recording is performed in the follow-up playback mode (with the video on a display halted) will be explained.

Upon receiving a playback request from the user operating the remote controller, the user I/F module 200 starts the playback processing 600 to perform a playback for the follow-up playback operation.

Figure 6:
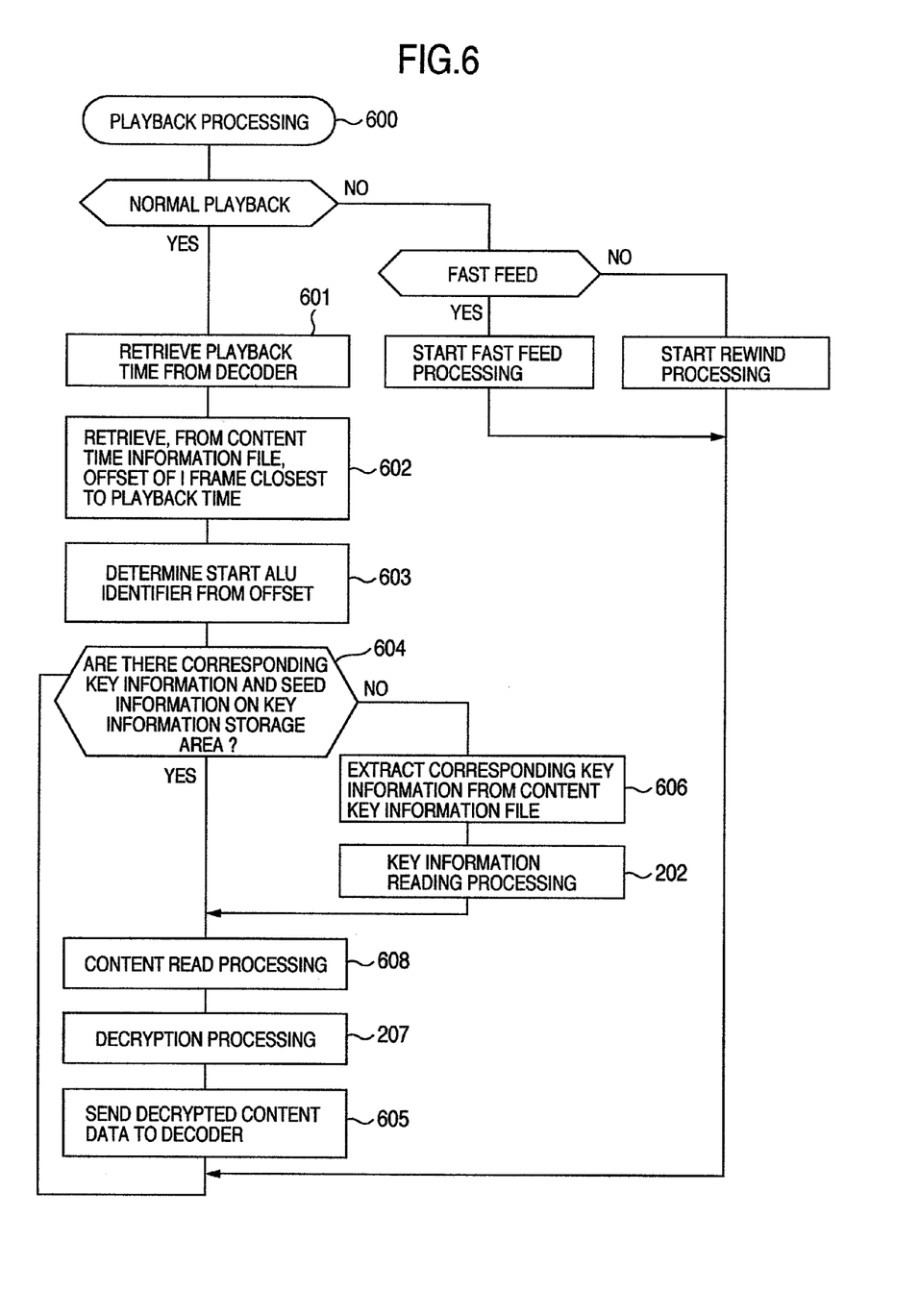
FIG. 6 shows an example flow of playback processing.

A flow of the playback processing 600 will be described by referring to FIG. 6. Upon receiving a playback request, the playback processing 600 retrieves a current playback time from the decoder 113 (step 601).

To determine the position of the content data to be played, the playback processing 600 retrieves, from the corresponding content time information file 144, an offset from the head of an area where the I frame closest to the playback time is stored (step 602).

The reading and decryption of content data are performed in units of ALU. The following steps are executed successively to meet the playback time. The first processing may not satisfy the ALU size. In that case, the processing is executed in a size less than ALU.

An ALU identifier that stores the content data to be read out is determined from the offset (i.e., a value obtained by rounding down fractions of a number determined from offset/1.5 MB) (step 603).

Next, from the start position 303 and end position 304 of two key information management areas 300, a check is made as to whether the key information 305 and seed information 306 of interest exist (step 604).

If they exist, the control moves to content reading processing.

If not, an identifier of the associated key information is searched through the content key information file 143 (step 606).

The key reading processing 202 is called to read key information and seed information corresponding to the searched key information identifier. In cooperation with the tampering prevention area read/write processing 132 in the hard disk drive 100, the key reading processing 202 performs reading from the tampering prevention area 106. More specifically, it executes authentication, establishes an encrypted communication path, and reads the key information and seed information of the tampering prevention area 106 over the communication path (step 202).

In parallel with the above steps, the key reading processing 202 reads the corresponding content data onto the buffer memory 121 (step 208).

When the reading of the key information and seed information and the reading of the content data in ALU units are completed, the decryption processing 207 is started (step 207).

Decrypted data is sent to the decoder 113 which starts to play the content data (step 605).

Figure 7:
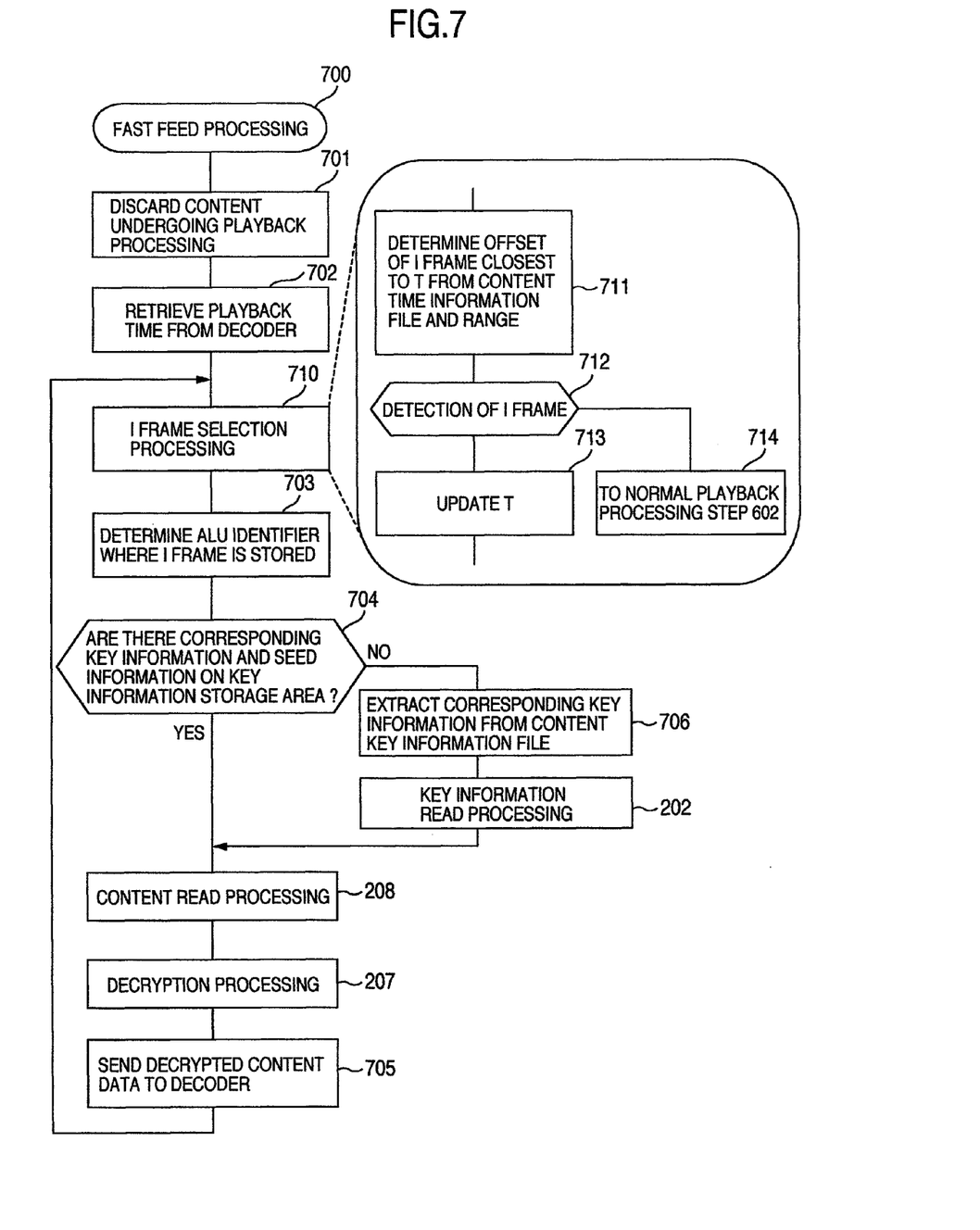
FIG. 7 shows an example flow of fast feed processing.

Next, processing executed when a user fast feed is requested during the playback state will be explained by referring to FIG. 7. Upon receiving a playback request from the user operating the remote controller, the user I/F module 200 notifies the playback processing 600 of the fast feed request during the follow-up playback.

When it receives a fast feed request during playback, the playback processing 600 first discards the content data stored in the buffer memory 121 and the content data being decrypted in order to nullify the content data currently undergoing the playback processing (step 701).

The current playback time is retrieved from the decoder 113 (step 702). I frame to be displayed is selected (step 710). Selection of I frame is performed in a procedure described in the playback processing.

An ALU identifier where the I frame is stored is determined (step 703). The I frame may spread over two or more ALUs.

From the start position 303 and end position 304 of two key information management areas 300, a check is made as to whether the key information 305 and seed information 306 of interest exist (step 704).

If they do not exist, an identifier of the associated key information is searched through the content key information file 143 (step 706).

The key reading processing 202 is called to read key information and seed information corresponding to the searched key information identifier. In cooperation with the tampering prevention area read/write processing 132 of the hard disk drive 100, the key reading processing 202 performs reading from the tampering prevention area 106. More specifically, it executes authentication, establishes an encrypted communication path, and reads the key information and seed information of the tampering prevention area 106 over the communication path (step 202).

In parallel with the above steps, the key reading processing 202 reads the selected I frame from the content data file (step 208).

When the reading of the key information and seed information and the reading of the I frame in ALU units are completed, the decryption processing 207 is started (step 207).

Decrypted data is sent to the decoder 113 which starts to play the content data (step 705).

I frame selection processing (710) will be explained.

It is assumed in the following that a playback is performed at an X-times speed and a fast feed at Y frames/second and that a playback time is T. When the processing is started for the first time, T is set with the playback time read from the decoder.

An offset of I frame closest to T is determined from the associated content time information file 144 (step 711).

If an offset of the corresponding I frame is not found, the fast feed is stopped and the control returns to the playback processing (step 712, 714).

To determine the time required for playback, X/Y is added to the playback time T. It is noted, however, that if the addition has already been executed (Y−1) times, X is added to T (step 713).

With the above sequence of steps taken, the encryption/decryption key for content data is updated in one minute. So, if the storing of the key information and seed information into a hard disk drive should take time, the latest key information and seed information can be obtained via memory, making it possible to perform the follow-up playback processing in units of ALU. As a result, in high-definition video (at a playback speed of about 25 Mbps), a catch-up operation that gets as close as 0.06 second at maximum can be realized.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A device to record and play back content data requiring copyright protection, comprising:
    a removable storage medium removably-connected to the device and having a first area and a second area,
        wherein the first area is used to store encrypted content data encrypted by encryption keys changed at a predetermined frequency defined by a predetermined period which is shorter than an overall play back period of the content data,
        wherein the second area is a tampering prevention area and used to store decryption keys and start and end positions for each decryption key,
    a CPU provided within the device, to execute programs; and
    a memory provided within the device and having a first key information management area and a second key information management area, each key information management area for temporarily storing a decryption key until the decryption key is changed at the predetermined frequency;
    wherein, said memory further stores content data during playback;
    wherein when a portion of the content data is recorded in the removable storage medium, the CPU: encrypts the portion of the content data by a first encryption key, generates a first decryption key to decrypt an encrypted portion of the content data encrypted by the first encryption key and stores the first decryption key in the first key information management area of the memory;
    wherein when, with the elapse of the predetermined period, an encryption key for the portion of the content data is changed from the first encryption key to a second encryption key, and the CPU: generates a second decryption key to decrypt the encrypted portion of the content data encrypted by the second decryption key, stores the second decryption key in the second key information management area of the memory, and stores the first decryption key and the start and end positions for the first decryption key in the second area of the removable storage medium,
    wherein, when encrypted content data already recorded in the removable storage medium and beginning at a playback position is being played or fast-fed, while further encrypted content data is being recorded in the removable storage medium at a recording position:
    if the decryption key corresponding to the playback position is the first decryption key or the second decryption key held in the first key information management area or the second key information management area of the memory, the CPU decrypts the encrypted content data by using the first decryption key or the second decryption key in the first key information management area or the second key information management area, and
    if the decryption key corresponding to the playback position is neither the first decryption key nor the second decryption key held in the first key information management area or the second key information management area of the memory, the CPU obtains the decryption key from the removable storage medium and decrypts the encrypted content data by using the decryption key obtained from the removable storage medium;
    wherein, when a fast feed request is performed during playback, all content data, including all data that is being decrypted is first discarded from the memory, thereby nullifying the content data currently under-going playback.

2. The device as claimed in claim 1, wherein the removable storage medium is a removable Secure iVDR medium.

3. The device as claimed in claim 1, wherein the first key information management area and second key information management area are used alternately to store the decryption key as the decryption key is changed.

4. A method to record and play back content data via a device for recording and playing back content data requiring copyright protection, where the device includes removable storage medium removably-connected to the device, a CPU provided within the device to execute programs and a memory provided within the device, the method comprising:

managing a first area and a second area in the removable storage medium,
- wherein the first area is used to store encrypted content data encrypted by encryption keys changed at a predetermined frequency defined by a predetermined period which is shorter than an overall play back period of the content data,
- wherein the second area is a tampering prevention area and used to store decryption keys and start and end positions for each decryption key, managing a first key information management area and a second key information management area in the memory, each key information management area for temporarily storing a decryption key until the decryption key is changed at the predetermined frequency;

wherein, the memory further stores content data during playback;

wherein when a portion of the content data is recorded in the removable storage medium, the CPU: encrypts the portion of the content data by a first encryption key, generates a first decryption key to decrypt an encrypted portion of the content data encrypted by the first encryption key and stores the first decryption key in the first key information management area of the memory;

wherein when, with the elapse of the predetermined period, an encryption key for the portion of the content data is changed from the first encryption key to a second encryption key, and the CPU: generates a second decryption key to decrypt the encrypted portion of the content data encrypted by the second decryption key, stores the second decryption key in the second key information management area of the memory, and stores the first decryption key and the start and end positions for the first decryption key in the second area of the removable storage medium, wherein, when encrypted content data already recorded in the removable storage medium and beginning at a playback position is being played or fast-fed, while further encrypted content data is being recorded in the removable storage medium at a recording position:

if the decryption key corresponding to the playback position is the first decryption key or the second decryption key held in the first key information management area or the second key information management area of the memory, the CPU decrypts the encrypted content data by using the first decryption key or the second decryption key in the first key information management area or the second key information management area, and if the decryption key corresponding to the playback position is neither the first decryption key nor the second decryption key held in the first key information management area or the second key information management area of the memory, the CPU obtains the decryption key from the removable storage medium and decrypts the encrypted content data by using the decryption key obtained from the removable storage medium;

wherein, when a fast feed request is performed during playback, all content data, including all data that is being decrypted is first discarded from the memory, thereby nullifying the content data currently under-going playback.

5. The method as claimed in claim 4, wherein the removable storage medium is a removable Secure iVDR medium.

6. The method as claimed in claim 4, wherein the first key information management area and second key information management area are used alternately to store the decryption key as the decryption key is changed.

7. A non-transitory computer-readable medium embodying a program enabling record and play back of content data via a device for recording and playing back content data requiring copyright protection, where the device includes removable storage medium removably-connected to the device, a CPU provided within the device to execute programs and a memory provided within the device, the program effecting operations comprising:

managing a first area and a second area in the removable storage medium,
- wherein the first area is used to store encrypted content data encrypted by encryption keys changed at a predetermined frequency defined by a predetermined period which is shorter than an overall play back period of the content data,
- wherein the second area is a tampering prevention area and used to store decryption keys and start and end positions for each decryption key, managing a first key information management area and a second key information management area in the memory, each key information management area for temporarily storing a decryption key until the decryption key is changed at the predetermined frequency;

wherein, the memory further stores content data during playback;

wherein when a portion of the content data is recorded in the removable storage medium, the CPU: encrypts the portion of the content data by a first encryption key, generates a first decryption key to decrypt an encrypted portion of the content data encrypted by the first encryption key and stores the first decryption key in the first key information management area of the memory;

wherein when, with the elapse of the predetermined period, an encryption key for the portion of the content data is changed from the first encryption key to a second encryption key, and the CPU: generates a second decryption key to decrypt the encrypted portion of the content data encrypted by the second decryption key, stores the second decryption key in the second key information management area of the memory, and stores the first decryption key and the start and end positions for the first decryption key in the second area of the removable storage medium, wherein, when encrypted content data already recorded in the removable storage medium and beginning at a playback position is being played or fast-fed, while further encrypted content data is being recorded in the removable storage medium at a recording position:

if the decryption key corresponding to the playback position is the first decryption key or the second decryption key held in the first key information management area or the second key information management area of the memory, the CPU decrypts the encrypted content data by using the first decryption key or the second decryption key in the first key information management area or the second key information management area, and if the decryption key corresponding to the playback position is neither the first decryption key nor the second decryption key held in the first key information management area or the second key information management area of the memory, the CPU obtains the decryption key from the removable storage medium and decrypts the encrypted content data by using the decryption key obtained from the removable storage medium;

wherein, when a fast feed request is performed during playback, all content data, including all data that is being decrypted is first discarded from the memory, thereby nullifying the content data currently under-going playback.

8. The non-transitory computer-readable medium as claimed in claim 7, wherein the removable storage medium is a removable Secure iVDR medium.

9. The non-transitory computer-readable medium as claimed in claim 7, wherein the first key information management area and second key information management area are used alternately to store the decryption key as the decryption key is changed.

* * * * *